(12) United States Patent
Meyer et al.

(10) Patent No.: US 6,236,866 B1
(45) Date of Patent: May 22, 2001

(54) ADAPTIVE ANTENNA PATTERN CONTROL FOR A MULTIPLE ACCESS COMMUNICATION SYSTEM

(75) Inventors: Ronald L. Meyer, Plano; Ramaiah Velidi, Dallas, both of TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/298,713

(22) Filed: Apr. 23, 1999

Related U.S. Application Data

(60) Provisional application No. 60/085,749, filed on May 15, 1998.

(51) Int. Cl.[7] .................................................. H04Q 7/20

(52) U.S. Cl. .......................................... 455/562; 370/342

(58) Field of Search .............................. 455/422, 562, 455/279.1, 517, 453, 424, 425; 370/341, 347, 342, 441, 442, 333, 332, 334, 335, 320, 311, 479; 343/726, 703, 751; 342/360, 368, 373

(56) References Cited

U.S. PATENT DOCUMENTS

| | | | |
|---|---|---|---|
| 4,747,160 | * 5/1988 | Bossard | 455/33 |
| 4,896,371 | 1/1990 | Kahn | 455/105 |
| 4,931,802 | 6/1990 | Assal et al. | 342/356 |
| 4,965,605 | 10/1990 | Chang et al. | 343/700 MS |
| 5,014,067 | * 5/1991 | Chisholm | 342/407 |
| 5,081,463 | * 1/1992 | Hariu et al. | 342/372 |
| 5,203,018 | 4/1993 | Hirose | 455/61 |
| 5,276,907 | 1/1994 | Meidan | 455/333 |
| 5,319,677 | 6/1994 | Kim | 375/100 |
| 5,432,780 | * 7/1995 | Smith et al. | 370/37 |
| 5,488,737 | 1/1996 | Harbin et al. | 455/33.1 |
| 5,542,107 | 7/1996 | Kay | 455/33.1 |
| 5,548,813 | 8/1996 | Charas et al. | 455/33.3 |
| 5,563,610 | 10/1996 | Reudink | 342/375 |
| 5,574,989 | 11/1996 | Watson et al. | 455/101 |

(List continued on next page.)

FOREIGN PATENT DOCUMENTS

| | | | |
|---|---|---|---|
| 0624919A1 | 11/1994 | (EP) . | |
| 0668627A1 | 8/1995 | (EP) . | |
| 0777400A2 | 6/1997 | (EP) | H04Q/7/36 |
| 0837523A2 | 4/1998 | (EP) | H01Q/3/26 |
| 2290006A | 12/1995 | (GB) . | |
| 2301712A | 12/1996 | (GB) . | |
| WO 95/22210 | 8/1995 | (WO) | H04B/7/26 |
| WO95/26116 | 9/1995 | (WO) . | |
| WO 97/11508 | 3/1997 | (WO) | H01Q/25/00 |

OTHER PUBLICATIONS

Metawave™ Spotlight™ 2000 (Advertisement) "Amps and Namps".

*Primary Examiner*—Edward F. Urban
*Assistant Examiner*—Congvan Tran
(74) *Attorney, Agent, or Firm*—Baker Botts L.L.P.

(57) ABSTRACT

Dynamic antenna pattern modification is accomplished with multi-element, multi-column antennas having the radiation pattern controlled dynamically based on the number of users serviced by the sectors of a multi-sector base station. The number of users is determined either directly through information available from the base station, or indirectly by monitoring the system load (number of users). Sectors of the cell servicing fewer users are expanded to accommodate users from portions of an adjacent sector, in the same cell, by modification of the antenna coverage patterns in each sector. The antenna pattern for a sector serving a relatively large number of users, for a given cell radius, would contract in azimuth for both transmit and receive functions and decrease both transmitted output power and received signal sensitivity. Simultaneously, antenna coverage patterns in the adjacent sector (in the same cell) would expand in azimuth to provide the same cell radius, coverage and performance level as prior to the pattern modification.

14 Claims, 5 Drawing Sheets

U.S. PATENT DOCUMENTS

| | | | | |
|---|---|---|---|---|
| 5,596,333 | * | 1/1997 | Bruckert | 342/457 |
| 5,648,968 | | 7/1997 | Reudink | 370/33 |
| 5,812,935 | | 9/1998 | Kay | 455/56.1 |
| 5,920,813 | * | 7/1999 | Evans et al. | 455/422 |
| 5,936,577 | * | 8/1999 | Shoki et al. | 342/373 |
| 5,940,029 | * | 8/1999 | Ninomiya et al. | 342/372 |
| 6,038,459 | * | 3/2000 | Searle et al. | 455/562 |
| 6,070,090 | * | 5/2000 | Feuerstein | 455/561 |

* cited by examiner

ADAPTIVE ANTENNA PATTERN CONTROL FOR A MULTIPLE ACCESS COMMUNICATION SYSTEM

RELATED APPLICATION

This application claims the benefit of pending U.S. provisional application Ser. No. 60/085,749, filed May 15, 1998, entitled ADAPTIVE ANTENNA PATTERN CONTROL FOR A MULTIPLE ACCESS COMMUNICATION SYSTEM.

TECHNICAL FIELD OF THE INVENTION

The present invention relates to wireless communications systems and in particular to apparatus and a method for antenna pattern modification to mitigate cell breathing.

BACKGROUND OF THE INVENTION

In wireless mobile code division multiple access (CDMA) communication systems, capacity and coverage are inter-related in a manner dictated by some key principles—the radio links are designed to operate at a minimum level consistent with voice quality; coverage area is dictated by area where the mobile station has sufficient power to achieve the target bit energy-to-noise ratio at the cell site (also known as the base station and referred to as BS) receiver. These considerations lead to fundamental design tradeoffs in CDMA systems—design coverage increases with lower capacity; coverage and or capacity increases with reduced voice quality.

CDMA is a modulation and multiple access scheme that is based on spread spectrum communications. CDMA signals are generated by modulating the data with pseudo-noise codes (for the particular case of direct sequence CDMA systems, these PN codes are a sequence of chips taking on values +1 or −1) which are signature codes assigned to individual users (herein referred to as mobile stations or MS). In a wireless mobile communication system, an MS communicates directly with the fixed entity, BS. The BS receiver identifies the individual MS by de-spreading the pseudo-noise signature codes and information data is extracted by demodulation.

CDMA communication systems are subject to one basic limitation that effects operation and design: all users are inherently interfering signals to all other users. This effects the CDMA system architecture and determines the limit (maximum theoretical user number) on how many interfering users can be present before system operation degrades to unacceptable levels. Additionally, maximum user capacity calculations inherently presume that all conditions are ideal. In a real world application of most systems this is not true, and CDMA systems are no different. With typical CDMA systems, even using perfectly orthogonal spreading codes, issues related to practical deployment become the main driver in the system (and therefore a network of systems) capacity calculations and functional operation. Each cell is surrounded by other cells that are transmitting similar (interfering) signals. Further, all users are not an equal distance from the base station causing each user's signal to be received with unequal strength compared to all other users (although user power control is attempted with modest success). In addition, the RF propagation environment provides multiple opportunities for signals to be reflected thereby causing unwanted signal strength variations at both the base station and the mobile station (Rayleigh fading, another effect attempted to be controlled by implementation of user power control). Together, these effects contribute to a reduction in the total system capacity, compared to theoretical maximums, along with variable system service coverage areas that change based on the number of users of the system. Additionally, implementation inaccuracies of the various algorithms in hardware and software typically further restrict the total number of users to a practical maximum limit.

Since each user is an interfering signal to all of the other users, the chosen system implementation (spreading code and bandwidth, data transmission rate, power control implementation, base station layout, and "soft" handoff algorithm and implementation) determines the total number of users which, as an undesired by-product, also determines the coverage area. Users with higher power than others present stronger interfering signals than weak power users, and therefore limit the overall number of users on the system by virtue of their signal strength. Once a system architecture has been chosen, CDMA system capacity is determined by the total interference power in the system; this power level can be generated by several high power users or by many more users of equally low power. The effect can be described as follows. When there are few users on the system, cells are relatively far apart, the coverage area of a typical cell is large, there are few interfering signals competing at the base station for network access, and weak signals (at the minimum designed receive signal level) are recognized and accepted. As more phone calls are accepted into the network the success of the system's ability to control each user's power becomes much more important. Those users closest to the base station would have a decided advantage over those far away, if no power control were implemented, since stronger users have a decided advantage in making phone calls (up to the maximum practical user limit). Typical wireless mobile phone CDMA systems address this situation by attempting to control the power transmitted by each user such that those both near to and far from the base station have the same power level at the receiver, and therefore an equal chance to acquire network resources (a "channel"). The measures taken to accomplish this are not completely successful, which accounts for some of the differences in capacity between expected theoretical and practical user limits of the typical CDMA system. The net effect of imperfect power control and real-world fading environments combined with a maximum practical user limit on each served area is that users further from the base station receive access only if the total user count in each served area is less than the maximum practical limit associated with that CDMA system. Given the inaccuracies of the power control implementation, even close users can be dropped from service if users closer to the base station request service and receive a channel to make a phone call. This effect has been referred to as the "breathing cell" phenomenon, meaning that the coverage area of a CDMA cell depends on how many users are accessing the system, their power, and their location at any time. As a result, CDMA service providers have trouble in determining where to place base stations in a network. It is difficult, if not impossible, to determine exact coverage areas based on typical RF propagation effects since the number of users, their location, and success of power control of the system determines the coverage pattern.

This "cell breathing" issue has been typically addressed in a brute force manner. The service provider essentially doubles the number of base stations covering a certain geographic area, compared to typical TDMA network layouts, such that most of the area is covered by at least two base stations, and sometimes three or more. This technique attempts to ensure that continued coverage is provided for users who have initiated phone calls and are being served by the network even when other users closer to the base station make phone calls into the network. Since the signal from the mobile in question is strong at several base stations, the phone call may be maintained if it is transferred from one base station to the other. Thus, the user in danger of being dropped has the call transferred by the network to another base station that has less than the maximum number of users so that the call is maintained. When the number of users of both base stations has reached the practical user limit, any new users vying for service are denied access. As a practical matter, this limit will eventually be reached in any system given more customers in a service area than the design limits of the CDMA.

In any mobile cellular system there exist two fundamental problems that a system designer has to deal with.

Multi-path fading of the radio link. This is a phenomenon where radio frequency (RF) signals when transmitted from either the MS or BS traverse multiple paths due to reflections off different objects in the environment before they arrive at the receiving antenna. These multiple reflected paths or multi-path components combine, either constructively or destructively, to produce fades in signal strength.

Multiple access interference or MAI. In CDMA systems, all MS transmit on the same frequency when communicating with the BS and therefore, as mentioned, each MS is a source of interference to every other MS. The level of MAI, to a first degree of approximation, is directly proportional to the number of MS signals received at the serving BS.

CDMA systems exploit the wideband characteristic of the spread spectrum waveforms to resolve the multi-path components and thus, provide the receiver with several independently fading signal paths. This path diversity is exploited by the use of a RAKE receiver to combine the different multi-path components. The same wideband nature of the CDMA signals is used to mitigate the MAI.

The link from the MS to BS is typically asynchronous and such a system is vulnerable to the near-far problem, that is, the problem of very strong undesired MS signals at the receiver swamping out the effects of a weaker, desired MS's signal. A solution to the near-far problem is the use of power control, which attempts to ensure that all signals from the mobiles within a given cell coverage area arrive at the BS of that cell with equal power. Coverage area or range performance is determined by the serving BS. A critical variable is the ratio of single bit energy-to-noise, EbNo, which is analogous to the signal-to-noise ratio in analog systems. An MS has to adjust power—increase or decrease—very fast to achieve target EbNo at the cell site receiver in an attempt to overcome the effects of multi-path fading. But when the MS is close to the edge of the BS coverage area it may be transmitting at peak power output. As the number of the MS increase, the MS at the cell edge will not be able to increase transmit power enough to achieve the target EbNo. Consequently, the range or coverage is sacrificed, resulting in the BS dropping the MS at the cell edge.

SUMMARY OF THE INVENTION

In accordance with the present invention, the basic effect of "cell breathing" coverage that varies by time of day due to traffic loads distributed unevenly across the cell is significantly mitigated through use of a dynamically sectored smart antenna (Dynamically Sectored Smart Antenna or DSSA) that contains both transmit and receive amplification electronics integrated with the antenna elements.

The DSSA design allows automatic and dynamic control and stabilization of geographical coverage of a cell without utilizing any feedback signal demodulated from the air interface with mobile station(s) in the coverage area. The antenna system operates on a "cell" basis with the possibility for any number of subdivisions of the 360 degree coverage that can be assigned or borrowed to efficiently utilize all of the capacity of the cell. Compared to fixed coverage antennas that restrict base station electronics to fixed RF/geographical areas, the DSSA allows for variation in both the range and azimuth coverage of a cell so that maintenance of substantial geographic coverage in a CDMA cell is possible. Extended coverage (compared to typical installations with tower top amplifiers) is provided initially, while user demand is light, due to the benefits of electronics/amplification integrated into the array. As network utilization and base station activity increases the DSSA will be programmed (in software and/or hardware) to convert from a range extension product to a capacity optimization and improvement product through use of the variable azimuth coverage. Range extension is initially provided through use of receive and transmit amplifiers that are distributed across the antenna elements. This integrated electronics array architecture, allows for dynamically adjustable gain on both receive and transmit, as well as soft degradation in the event of component failure. Dynamically adjustable gain is utilized to increase range coverage to maximum limits during initial system build out or, when capacity needs increase, to maintain a desired, fixed, range coverage with different azimuth coverage in sections of a cell, to enable full utilization of base station resources across the entire coverage area of the cell. Control of coverage areas is adjusted automatically by observation of one or more metrics, inherent in CDMA system operation, that provide an indication of the number of users of any sector of a cell. The information necessary to monitor these metrics will be determined independently by the antenna system through actual measurement of system operation (an applique product that could initiate phone calls into the network for purposes of measurement), or will be provided directly from the base station electronics.

An example metric is the number of users actively using a sector of the system at any time. This information may be determined through a measurement of the system noise floor. As the number of phone calls rises in any coverage area so does the "noise floor" of the system. This metric can be actively investigated, or passively monitored, by the DSSA system to determine when the noise floor rises to the capacity limit of the electronics associated with that sector of the coverage area. Just prior to when an overloaded condition is about to be experienced, antenna azimuth coverage is adjusted to allow RF resources from another section of the base station to serve customers in a sector of the "about to be overloaded" area. At the same time that azimuth coverage patterns are adjusted to equalize user load, antenna gain is simultaneously manipulated to maintain fixed base station range such that geographical coverage areas are maintained and no "holes" in the network coverage are experienced. This adjustment takes place in real-time on a schedule that supports compensation commensurate with the call access rate of the system so that changes keep up with user demand.

When one portion of the cell is about to experience maximum utilization (defined as call blocking when all available channels are taken), available resources from another portion of the cell are applied through a change in the coverage pattern(s) of the antenna(s) assigned to that cell. RF coverage is modified such that the electronics in each section of the base station are all exposed to the maximum number of users a station can handle. Call blocking only occurs when base station resources have been maximized. Dynamically adjustable azimuth antenna patterns, then, allow for stable range (distance) control in the network so that the number of redundant base stations necessary to compensate for the "breathing cell" phenomenon is significantly reduced or eliminated when basic system capacity is not severely exceeded. In the event that call blocking becomes prevalent in a particular cell, more DSSAs may be applied with more CDMA channels to continue the "cell splitting" function through continued application of more dynamically controlled azimuth antenna systems for additional capacity without the need for acquisition of additional sites or rights-of-way.

In accordance with the present invention, the coverage pattern of a CDMA cell sector is controlled so that it is less susceptible to expansion or contraction, due to the number and location of users serviced, through a technique which dynamically modifies the transmitting and receiving antenna patterns based on the number of users served in each sector. Sectors servicing few users would be allowed to accommodate users from portions of adjacent sectors, in the same cell, through dynamic modification of the antenna coverage patterns in each sector. The antenna pattern for a sector serving a relatively large number of users, for a given cell radius, would contract azimuthally for both transmit and receive functions and decrease both it's transmitted output power and received signal sensitivity. This allows coverage of a smaller azimuth area with the same cell radius while maintaining the same performance level, to maintain cell coverage limits. Simultaneously, the adjacent sector (in the same cell) antenna coverage patterns would expand in azimuth (and increase the power and received signal sensitivity) to provide the same cell radius, coverage, and performance level as prior to the pattern modification.

This dynamic antenna pattern modification is accomplished with multi-element, multi-column antennas, whose radiation pattern is controlled dynamically based on the number of users being serviced by that sector, in a cell.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1A:
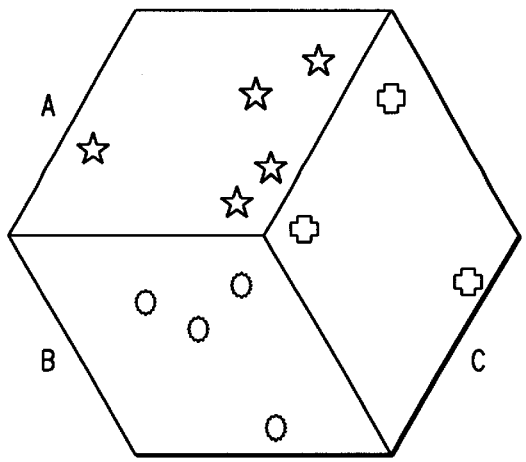
FIG. 1(a), FIG. 1(b), and FIG. 1(c) illustrate coverage patterns for a three-sector base station receiver illustrating various load conditions for each sector of the cell.
Figure 1B:
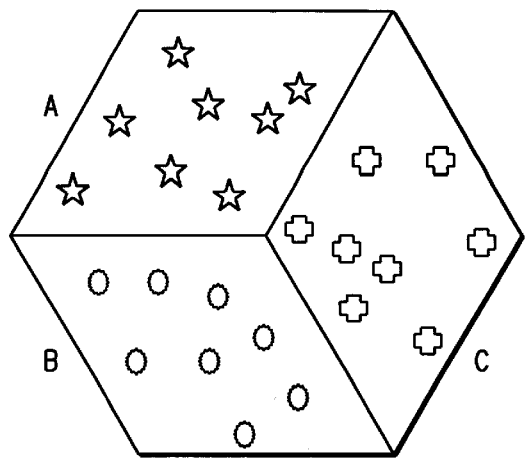
Figure 1C:
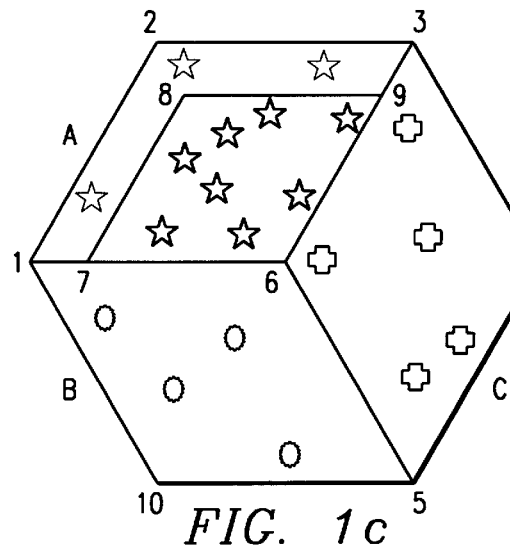

Referring to FIG. 1, there is shown the coverage patterns of the three sectors at a BS (base station) receiver. If it is assumed that each sector can support up to a maximum of 8 mobile stations, then FIG. 1(a) displays lightly loaded cells with less than 8 MS's per sector. In this case all MS achieve target performance without any loss of coverage area. FIG. 1(b) is an illustration of a fully loaded cell with 8 mobile stations per sector, and FIG. 1(c) illustrates sector A having more than its capacity limit, while sectors B and C are under-utilized. The coverage area of sector A contracts to the boundary defined by the area (6-7-8-9) to support the capacity limit of 8 users per sector, which is less than the original area (1-2-3-6). This is the capacity and coverage tradeoff, or the cell breathing phenomenon.

Currently CDMA wireless service providers attempt to limit the interference (in-cell plus out-cell) seen by the serving BS antenna, using directional 120 degree sectored antennas, giving a fixed or static coverage angle for each 120 degree sector. As each 120 degree sector antenna receives only in the direction of one-third of all the MS, the interference is approximately reduced by a factor slightly less than 3. Consequently, the system capacity increases by a factor of 3 and cell breathing is avoided only until the fixed-sector capacity limit is reached. Also, the fixed sectorization improvements are seen only if the interference (i.e., MS's) is uniformly distributed in each sector. This may or may not be the case in practice. This provides only a partial solution to the cell breathing problem.

Power control of MS transmit energy, as mentioned in the introduction, is another key element of almost all existing CDMA systems. However, it is difficult to obtain an accurate estimate of a rapidly changing power level in a time frame that is short compared to the rate of power change (generally a few fractions of a millisecond). Also, the application of power control in CDMA systems necessitates the use of soft handoff for two reasons—(a) when the old and new channels occupy the same frequency band; (b) the MS must be linked at all times to the BS from which it receives the strongest signal and soft handoff can guarantee this. To accommodate soft handoff, CDMA networks are designed such that a given geographic location is covered by two or more BS. This solution is highly inefficient with network resources as the MS has simultaneous traffic channel communication (i.e., phone call) with multiple candidate BS.

Figure 2:
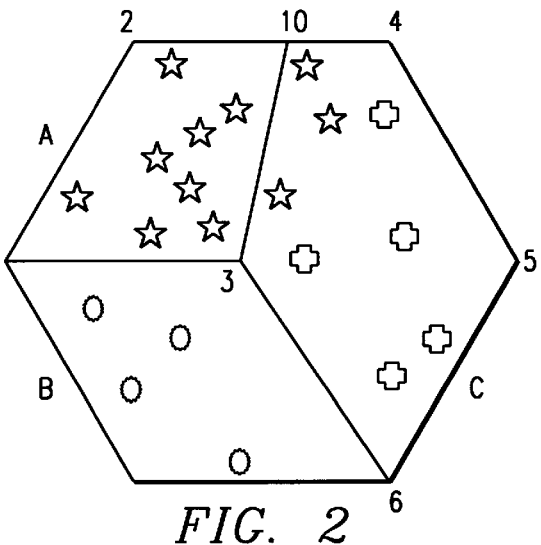
FIG. 2 is an illustration of the coverage patterns of the three sectors of a base station receiver showing dynamic coverage compensation in accordance with the present invention.

Referring to FIG. 2, there is shown an antenna pattern modified in accordance with the present invention to mitigate cell breathing. The coverage area for each of the three sectors of the BS are as follows: Sector A is initially defined by the area (1-2-3-6), Sector B is initially defined by the area (1-6-5-10), and Sector C has an original azimuth covering an area (3-4-5-6). With the addition of three "close in" users to Sector A but without the present invention, the coverage area for Sector A would contract to area (6-7-8-9), see FIG. 1(c), and the three users in area (1-7-8-9-3-2) would be dropped from coverage. In accordance with the present invention, as Sector A becomes overloaded with the three extra mobile stations, the coverage area for Sector A is contracted from area (1-2-3-6), see FIG. 1(c), to area (1-3-10-2), FIG. 2, while Sector C azimuth has coverage expanded from area (3-4-5-6), see FIG. 1(c), to area (4-5-6-3-10), FIG. 2. Thus, a sector servicing fewer users is adjusted to accommodate users from portions of an adjacent sector in the same cell, thereby dynamically modifying the antenna coverage pattern in each sector. The antenna pattern for Sector A servicing a relatively large number of users, for a given cell radius, is contracted in azimuth for both transmit and receive functions with a decrease in both transmitted output power and received signal sensitivity. This allows coverage of a smaller azimuth area with the same cell radius while maintaining the same performance level and maintaining cell coverage limits.

Figure 3:
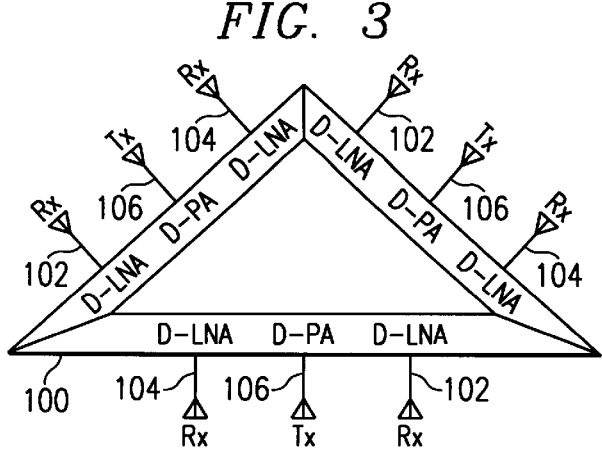
FIG. 3 illustrates a model of a base station of a code division multiple access transmit/receiving system employing 3-DSSAs.

Referring to FIG. 3, there is illustrated a base station 100 having three sectors each with dual polarization receive antennas 102 and 104 and a signal transmit antenna 106. The receive and transmit antenna of the base station is mounted on a conventional tower with distributed transmit and receive electronics integrated with the antenna elements. The electronics for the transmit antennas include distributed power amplifiers (D-PA) and the electronics for the dual polarization receive antennas include distributed low noise amplifiers (D-LNA) in a circuit configuration to be explained.

Figure 4:
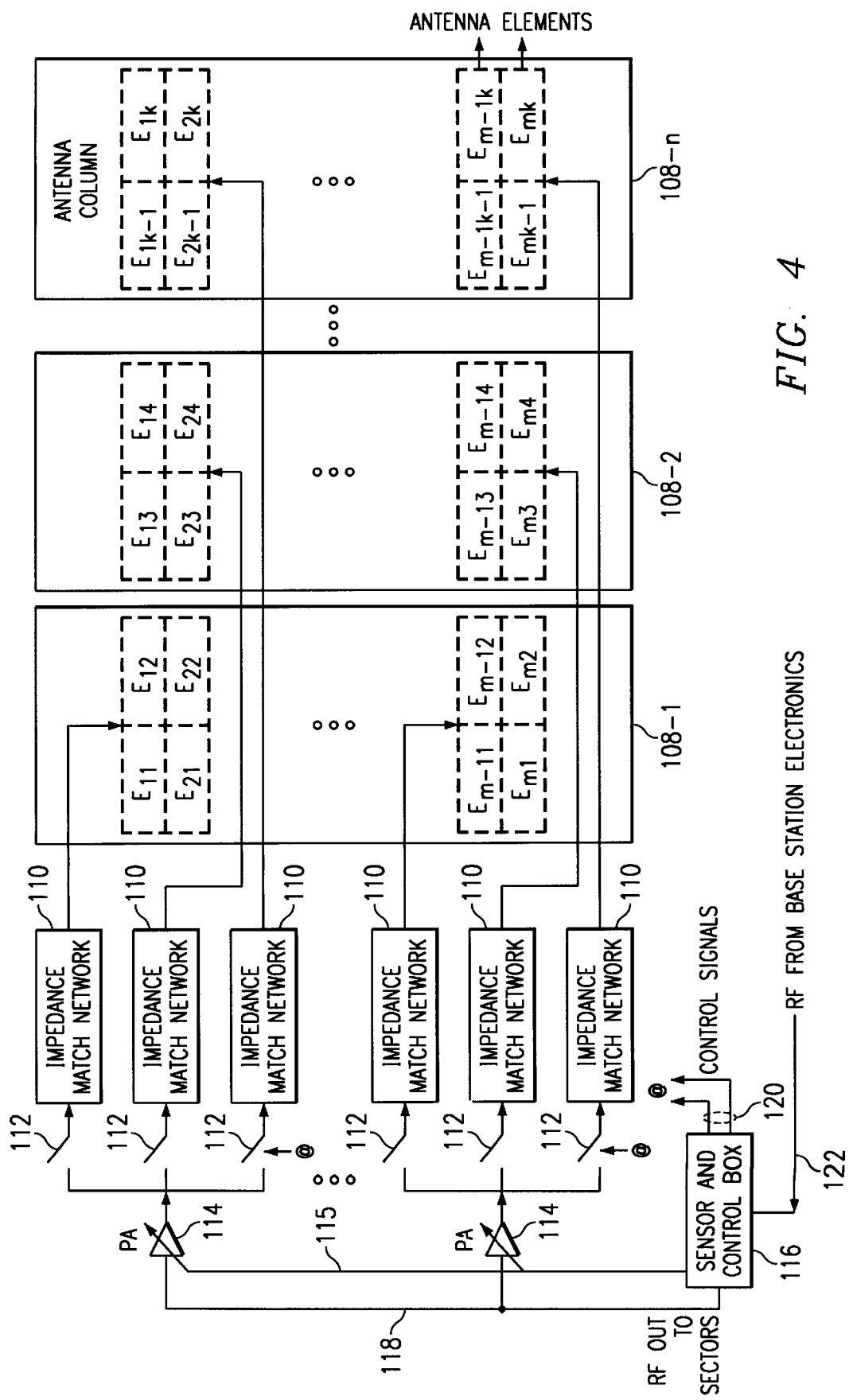
FIG. 4 is a block diagram of the transmit architecture of a dynamic coverage compensated base station in accordance with the present invention.

Referring to FIG. 4, there is illustrated a block diagram of the transmit portion of the base station 100. As illustrated, the antenna includes multi-element, multi-column panels 108-1, 108-2 through 108-n. The number of panels in the antenna is determined by the design parameters of the base station. Each panel includes multi-row and multi-column elements identified in the figure with the letter "E" followed by a numerical subscript. Connected to each panel of four elements in the panels 108-1 through 108-n is an impedance matching network 110. The number of such impedance matching networks varies with the number of elements in a panel and the number of panels in the antenna. The signals to be transmitted from the antenna 106 are input to the impedance matching networks 110 through control switches 112. For the three panel antenna illustrated in FIG. 4, each group of three control switches 112 are interconnected to a distributed power amplifier 114. The distributed power amplifiers are provided with a gain control input on a line 115 from a sensor and control box 116. The sensor and control box 116 also supplies the RF output signal applied to each of the power amplifiers 114 by means of a connection 118.

Figure 5:
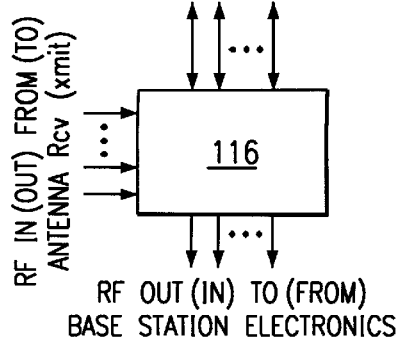
FIG. 5 is a block diagram of the control box of FIG. 4 illustrating the RF input/outputs and various control and programming signals.

Referring to FIG. 5, there is shown the various inputs and outputs for the sensor and control box 116. It should be understood that the sensor and control box 116 includes a programmed computer and is also a component of each of the receive networks. In addition to the signals to the transmit elements of the antennas 106, identified as outputs "RF out", the sensor and control box 116 receives signals from the elements of the receive antennas 102 and 104, identified as inputs "RF in". In addition, the sensor and control box 116 receives input/output control signals, fault detection and isolation control signals. The sensor and control box 116 outputs antenna pattern control signals for the electronics on the tower remote programming inputs from either an external computer or the base station electronics.

Referring again to FIG. 4, the antenna pattern control signals are output from the sensor and control box 116 on lines 120 and applied to each of the control switches 112 to control power to each element of the panels 108-1 through 108-n. By means of the control signals from the sensor and control box 116 applied to the control switches 112, the antenna pattern of the base station 100 is modifiable in azimuth. For example, the antenna panels 108-1 through 108-n are configured to transmit in 90, 120, or 150 degrees in azimuth. In a preferred configuration, all elements in one of the panels will be connected to corresponding power amplifiers 114 to provide one of the possible antenna azimuth coverage patterns. All elements in each panel will be connected to their corresponding power amplifiers when different panels are selected to effect the desired azimuthal coverage. Finally, with reference to FIG. 4 the RF signal from the base station (not shown) is applied to the sensor and control box 116 by means of a line 122.

Figure 6:
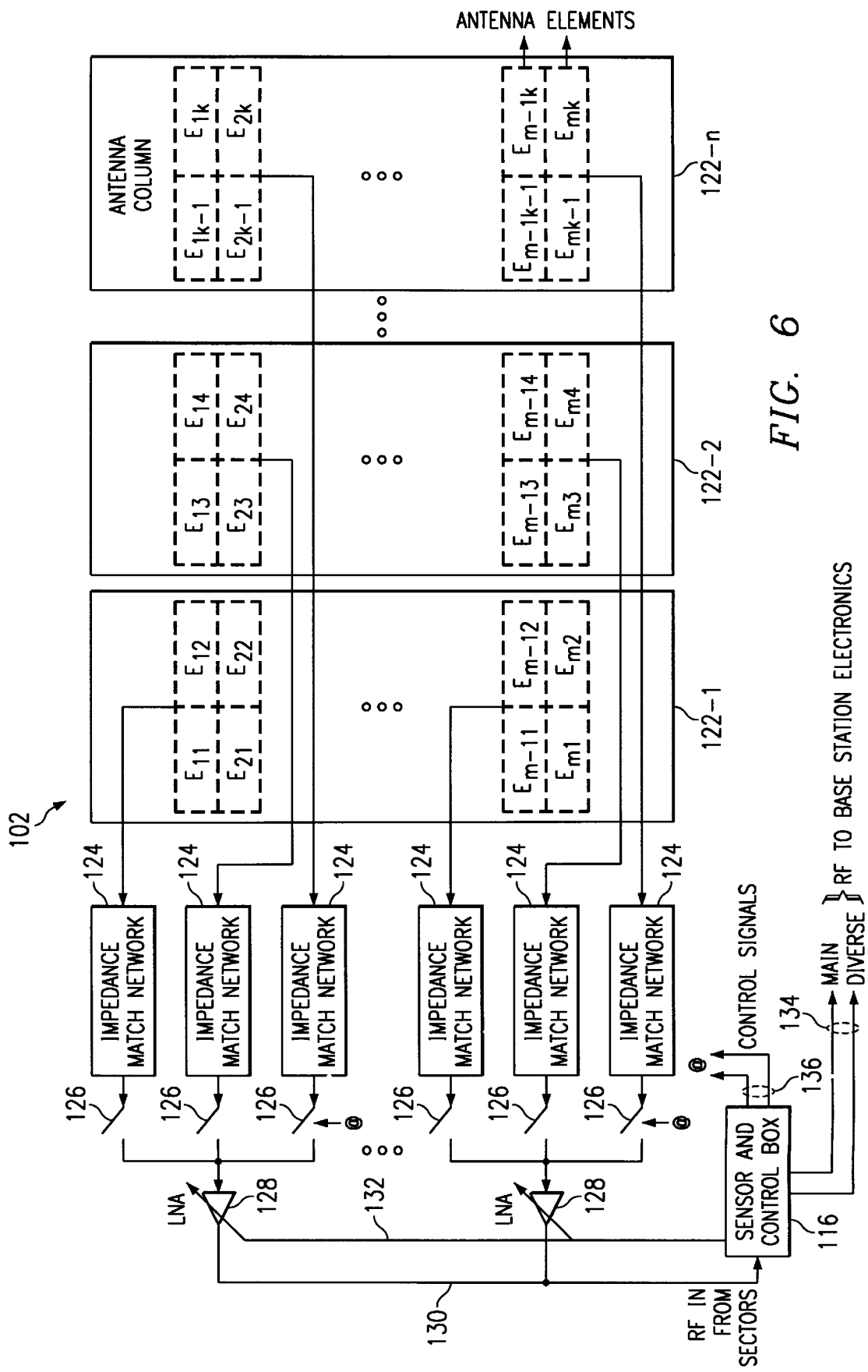
FIG. 6 is a block diagram of the receive architecture for one polarity of a dynamic coverage compensated base station in accordance with the present invention.
Figure 7:
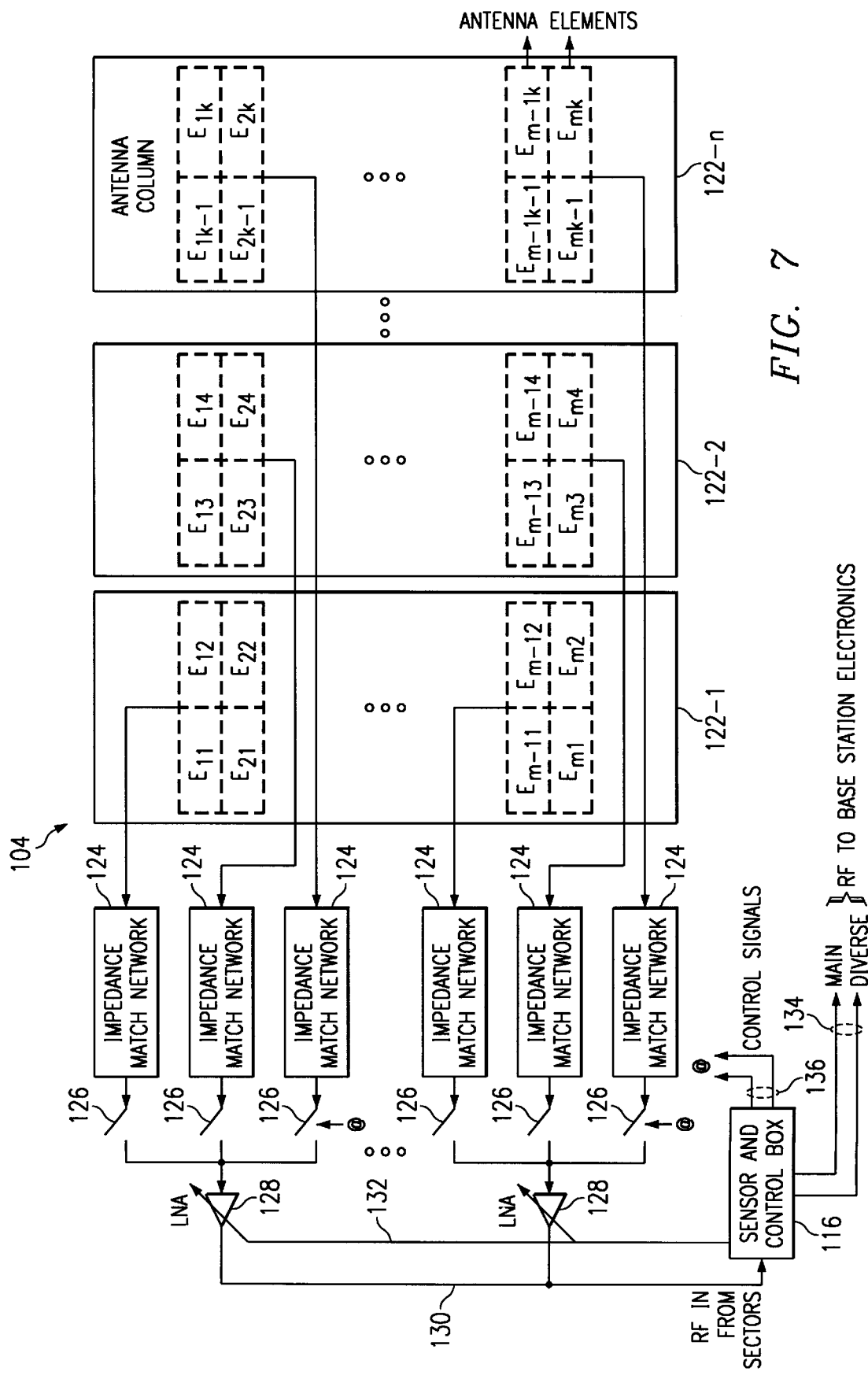
FIG. 7 is a block diagram of receive architecture of a second polarity (orthogonal to the first polarity) of a dynamic coverage compensated base station in accordance with the present invention.

Referring to FIGS. 6 and 7, there is shown the system architecture for each of the receive antennas 102 and 104. The architecture for the antennas 102 and 104 is the same except that the elements of one of the receive antennas is positioned to receive signals orthogonally with reference to the second receive antenna. Inasmuch as this is the only difference between the architecture of FIG. 6 and FIG. 7, the same reference numerals will be used for the various components.

Each receive antenna includes multi-element, multi-column panels 122-1 through 122-n. The elements of each antenna panel 122 are grouped in sub-sets (for example, a 4×4 grid of elements) to an impedance matching network 124. To activate each of the sub-sets of elements connected to the impedance matching networks 124, the output of each network is interconnected to a control switch 126. The control switches 126 for each impedance matching network 124 connected to the same sub-set in each of the antenna panels 122-1 through 122-n are interconnected to a distributed low noise amplifier 128. Each of the low noise amplifiers 128 has an output interconnected over a line 130 to the sensor and control box 116. In addition, each of the low noise amplifiers 128 is provided with a gain control adjusted by a power control signal on a line 132 from the sensor and control box 116.

RF signals received by the elements of the antenna panels 122-1 through 122-n are output from the sensor and control box 116 on lines 134 to the base station (not shown). Also output from the sensor and control box 116 are antenna pattern control signals on lines 136 connected to each of the control switches 126. As previously mentioned, the system architecture for each of the receive antennas 102 and 104 is similar. The receive antennas 102 and 104 are also functionally similar.

The DSSA of the present invention will operate in either integrated or applique form (with respect to a base station), and is based on a determination of the number of users in each sector. The number of users may be determined either directly through information available from the base station, or indirectly by monitoring the system load (number of users) with a CDMA phone function included along with the antenna array processing. The CDMA phone function would be used to periodically make a phone call into the CDMA network, using an antenna mounted inside the sector antenna system. This periodic phone call would be used to measure system load through a measurement of the averaged received bit effort rate (BER), which is a function of the received signal to noise ratio (SNR). The received BER is determined by comparing the received signal with it's associated transmitted data pattern (which is known because it was initiated by the CDMA phone function inside the smart antenna). For a given number of users in the sector, the BER (or range of BER) at a given signal strength is well known. Consequently, this relationship is exploited for use as the determining factor for the number of users being serviced at any time. As more or fewer users are serviced by the sector, the cross-correlation noise floor will rise or fall accordingly, thus affecting the system performance, i.e., the system noise floor, system power control adjustments, and therefore the BER. The resultant increase or decrease in BER, or changes in system power control setting, provides an excellent, dynamic, indication of system resource loading. These indicators would be inputs to calculate a metric for modifying antenna patterns in each sector in response to a change in traffic density serviced by that sector and the entire cell.

Figure 8:
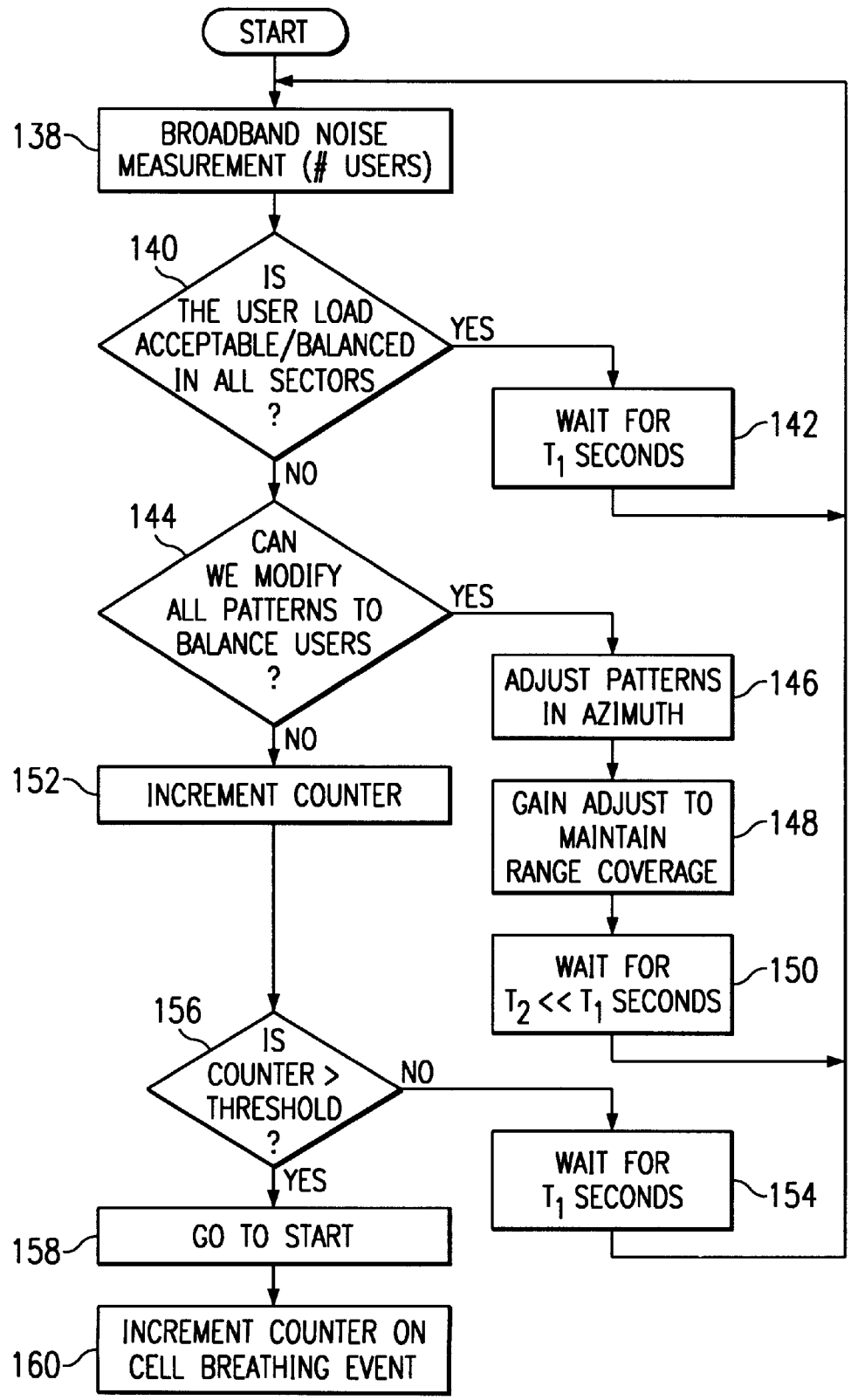
FIG. 8 is a processing flow diagram illustrating the program resident in the control box of FIGS. 4, 6, and 7.

Referring to FIG. 8, there is illustrated a flow chart for describing the basic operation of a dynamically sectored smart antenna (DSSA). The number of mobile stations active in any of the Sectors A, B, or C (see FIG. 3) of a cell is determined by measuring the system noise floor as input to the base station electronics. Thus, the broadband measurement 138 determines the level of system loading or utilization (or if the system is exclusively comprised of voice users it is a reflection of the number of users of any sector) of the base station 100 of FIG. 3. The level of the system noise floor in any one sector is directly proportional to the number of MS signals received at the BS. As more or fewer mobile stations are serviced by the base station, the noise floor will rise or fall accordingly. This provides an excellent and dynamic measurement for the DSSA system to determine the system utilization in each sector. The sensor and control box 116 includes a programmed computer that runs the supervisory algorithm that utilizes the noise floor measurement of each sector as an input to generate antenna pattern modification control signals on lines 136 for the receive antennas and lines 120 for the transmit antenna. Utilizing the noise floor measurement, the algorithm performs an acceptable/balanced evaluation 140 to determine if the user load of the system is acceptable and balanced in all sectors. Following this acceptable/balanced evaluation 140, the processing flow responds to a "yes" determination by advancing to a time delay 142 and at the conclusion of the time-out the process returns to re-run the broadband noise measurement 138.

An unacceptable or unbalanced response at the evaluation 140 advances the processing flow to evaluate if the patterns of all the sectors can be balanced as to mobile station users. Following a positive response to a modification evaluation 144, the sensor and control box 116 generates azimuth pattern adjustment signals during a subroutine 146. The antenna pattern for a sector serving a relatively large number of users would contract in azimuth for both the transmit and receive functions, while simultaneously decreasing the transmitted output power and receive signal sensitivity. Antenna gain adjustment in a sub-routine 148 maintains the target range of coverage and mitigates the cell breathing effect. While the antenna pattern for a sector serving a relatively large number of users is contracted, the adjacent sector (in the same cell) has the antenna pattern covering expanded in azimuth, while simultaneously increasing the transmit power and received signal sensitivity to maintain the total cell coverage prior to the pattern modification. This basic operation is illustrated in FIG. 2 as previously explained. Following the azimuth pattern adjustment 146 and the gain adjustment 148, the algorithm run by the programmed computer of the sensor and control box 116 enters a time delay 150. At the conclusion of the time delay the process returns to re-run the noise measurement 138.

When modification of patterns to balance the users cannot be achieved, the process flow advances to increment a counter 152. When a determination is made that the patterns cannot be modified, a condition that exists when the system capacity limit is reached and the resources cannot be balanced, a predetermined time delay is activated at 154. At the conclusion of the time delay, the process returns to re-run the noise measurement 138. A sub-routine activates a counter, the threshold of which is evaluated by a threshold determining inquiry 156 following incrementing of the counter. If the counter threshold evaluation 156 produces a positive response, then the algorithm run by the programmed computer of the control box enters a sub-routine 158 to maintain the patterns of each of the sectors return to rerun the noise measurement 138. This triggers incrementing a counter to log a cell breathing event during an increment evaluation 160.

By operation of the supervisory algorithm in the programmed computer of the sensor and control box 116, the patterns of each sector of the base station 100 are adjusted both in azimuth and in range. The adjustment for range is to maintain a designed cell range as the patterns are adjusted in azimuth.

Although several embodiments of the present invention have been described in the foregoing detailed description and illustrated in the accompanying drawings, it will be understood by those skilled in the art that the invention is not limited to the embodiments disclosed, but is capable of numerous rearrangements, substitutions and modifications without departing from the spirit of the invention.

We claim:

1. A CDMA multi-cell communication system having a base station transmitting RF signals to at least one mobile station and receiving RF signals from at least one mobile station, comprising:

a multi-element transmit antenna for each of a plurality of sectors of a cell;

a multi-element receive antenna for each of the plurality of sectors of a cell, the multi-element receive antenna co-located with the multi-element transmit antenna;

a plurality of control switches, one control switch connected to designated elements of the receive antenna;

means for interconnecting the plurality control switches in groups, each group of control switches connected to similarly positioned designated elements of the receive antenna;

a plurality of adjustable gain control circuits for adjusting the energy for the receive antenna, each adjustable gain control circuit connected to one of the groups of control switches; and a controller connected to the plurality of adjustable gain control circuits and the plurality of control switches and generating control signals for adjusting the receive antenna pattern of each sector of the cell in azimuth and adjusting the receive antenna energy to maintain substantially the equivalent range coverage for each adjustment of the receive antenna pattern in azimuth.

2. The CDMA multi-cell communication system as set forth in claim 1 wherein each adjustable gain control circuit comprises an amplifier having one terminal connected to the means for interconnecting and a second terminal connected to said controller, each amplifier adjusted in gain by a control signal from said controller.

3. A CDMA multi-cell communication system as set forth in claim 1 wherein said multi-element receive antenna comprises a first receive antenna of a plurality of elements of a first polarity and a second receive antenna of a plurality of elements of a second polarity, the second polarity orthogonal to the first polarity.

4. A CDMA multi-cell communication system as set forth in claim 3 when said controller comprises a processor executing a program for measuring the number of mobile stations active in each cell of the multi-cell communication system.

5. A CDMA multi-cell communication system as set forth in claim 1 further comprising a plurality of impedance matching networks, one impedance matching network connected to one of the plurality of control switches and to the interconnected designated elements.

6. Apparatus for adaptive azimuth receive pattern control in a CDMA multi-cell communication system transmitting RF signals to at least one mobile station and receiving RF signals from at least one mobile station, each cell having a multi-sector receive antenna, comprising:
- a plurality of control switches, one control switch connected to one sector on the multi-sector, multi-element receive antenna;
- a plurality of adjustable gain control circuits for adjusting the energy of each sector of the receive antenna, each adjustable gain control circuit individually connected to one sector of the multi-sector antenna; and
- a controller connected to the plurality of adjustable gain control circuits and the plurality of control switches and generating control signals for adjusting the receive antenna pattern of each sector in azimuth and for adjusting the receive antenna energy to maintain substantially the equivalent range of coverage area for each adjustment of the receive antenna pattern in azimuth.

7. Apparatus for adaptive pattern control as set forth in claim 6 wherein each adjustable gain control circuit comprises an adjustable gain amplifier having one terminal connected to one of the plurality of control switches and another terminal connected to said controller.

8. Apparatus for adaptive pattern control as set forth in claim 6 wherein said controller comprises a processor running a program for measuring the number of mobile stations active in each cell of the multi-sector receive antenna.

9. Apparatus for adaptive pattern control as set forth in claim 8 wherein the program run by the processor of said controller determines an acceptable load level and load balance for each sector of the multi-sector receive antenna.

10. Apparatus for adaptive pattern control as set forth in claim 9 wherein the program run by the processor of said controller generates control signals to adjust the receive antenna pattern in azimuth and the receive antenna energy to maintain substantially the equivalent range coverage area for each adjustment of the receive antenna pattern in azimuth.

11. Apparatus for adaptive pattern control as set forth in claim 6 further comprising a plurality of impedance matching networks, one impedance matching network connected to one of the plurality of control switches and one sector of the multi-sector receive antenna.

12. A method for adaptive pattern control of a receive antenna in a multi-cell communication system, comprising:
- measuring the number of mobile stations active in each sector of a multi-sector base station;
- determining the load level for each sector of the base station;
- in response to a determination of the load level, determining the availability to adjust the pattern of a receive antenna in azimuth and to adjust the antenna energy to maintain a substantially equivalent range coverage;
- adjusting the receive antenna pattern of a sector in azimuth in response to a determination that the load level of a sector exceeds a pre-selected value;
- adjusting the level of the receive antenna energy for each sector of the base station to maintain substantially the equivalent range coverage for each adjustment of the receive antenna pattern in azimuth;
- incrementing a counter in response to a determination that the patterns of the receive antennas of the multi-sector base station cannot be adjusted;
- determining the counter level for comparison to a threshold level; and
- in response to a counter level below the threshold level, re-measuring the number of mobile stations active in each sector after a predetermined time interval.

13. The method of adaptive pattern control as set forth in claim 12 further comprising:
- in response to the counter exceeding the threshold, readjusting the pattern in azimuth and the antenna energy to return to a pattern for each sector as established during initiation of the communication system.

14. A method for adaptive pattern control as set forth in claim 13 further comprising:
- incrementing a breathing event counter in response to returning to the pattern for each sector as established on initiation of a communication system.

* * * * *

UNITED STATES PATENT AND TRADEMARK OFFICE
CERTIFICATE OF CORRECTION

PATENT NO.    : 6,236,866 B1                                              Page 1 of 1
DATED         : May 22, 2001
INVENTOR(S)   : Ronald L. Meyer et al.

It is certified that error appears in the above-identified patent and that said Letters Patent is hereby corrected as shown below:

Title page,
OTHER PUBLICATION: Insert -- Yamada, et al., "Base Station/Vehicular Antenna Design Techniques Employed in High-Capacity Land Mobile Communications System", Electrical Communications Laboratories, Vol. 35 No. 2, 1987, pp. 115 - 121. --.

Column 4,
Line 40, after "an" delete " applique", and insert -- appliqué --.

Column 10, claim 1,
Line 41, after "plurality", insert -- of --.

Signed and Sealed this

Fifth Day of March, 2002

*Attest:*

*Attesting Officer*

JAMES E. ROGAN
*Director of the United States Patent and Trademark Office*